(12) United States Patent
Frick et al.

(10) Patent No.: US 12,468,011 B2
(45) Date of Patent: Nov. 11, 2025

(54) SYSTEMS AND METHODS FOR MITIGATING TELECOMMUNICATIONS SIGNAL INTERFERENCE TO RADAR ALTIMETERS

(71) Applicant: Honeywell International Inc., Charlotte, NC (US)

(72) Inventors: Seth T. Frick, Saint Paul, MN (US); David Holden, Phoenix, AZ (US)

(73) Assignee: Honeywell International Inc., Charlotte, NC (US)

(*) Notice: Subject to any disclaimer, the term of this patent is extended or adjusted under 35 U.S.C. 154(b) by 489 days.

(21) Appl. No.: 18/050,070

(22) Filed: Oct. 27, 2022

(65) Prior Publication Data
US 2023/0393235 A1 Dec. 7, 2023

Related U.S. Application Data

(60) Provisional application No. 63/349,879, filed on Jun. 7, 2022.

(51) Int. Cl.
| | |
|---|---|
| *G01S 7/02* | (2006.01) |
| *G01S 13/88* | (2006.01) |
| *H04B 17/318* | (2015.01) |
| *H04B 17/345* | (2015.01) |
| *H04W 56/00* | (2009.01) |

(52) U.S. Cl.
CPC .............. *G01S 7/023* (2013.01); *G01S 13/88* (2013.01); *H04B 17/318* (2015.01); *H04B 17/345* (2015.01); *H04W 56/00* (2013.01)

(58) Field of Classification Search
None
See application file for complete search history.

(56) References Cited

U.S. PATENT DOCUMENTS

| | | |
|---|---|---|
| 7,558,532 B2 | 7/2009 | Falaki |
| 9,223,009 B1 | 12/2015 | Wasiewicz et al. |
| 9,557,409 B2 | 1/2017 | Ferguson |

(Continued)

FOREIGN PATENT DOCUMENTS

| | | |
|---|---|---|
| CN | 105319544 A | 2/2016 |
| EP | 3832350 A1 | 6/2021 |

(Continued)

OTHER PUBLICATIONS

European Patent Office, "Extended European Search Report", from EP Application No. 23176957.1, from Foreign Counterpart to U.S. Appl. No. 18/050,070, Oct. 17, 2023, pp. 1 through 14, Published: EP.

(Continued)

*Primary Examiner* — William Kelleher
*Assistant Examiner* — Ismaaeel A. Siddiquee
(74) *Attorney, Agent, or Firm* — Fogg & Powers LLC

(57) ABSTRACT

Techniques for mitigating network interference from impacting a radar altimeter implemented on a vehicle include determining signal parameters from received network signals from a telecommunications network, such as a 5G network. The signal parameters can include the signal strength of the network signals and the timing synchronization information of the network signals. The operation of the radar altimeter is adjusted based on the signal parameters received from the network signals.

20 Claims, 4 Drawing Sheets

(56) References Cited

U.S. PATENT DOCUMENTS

| | | | |
|---|---|---|---|
| 10,495,728 B2 | 12/2019 | Frick et al. | |
| 11,693,084 B2* | 7/2023 | Gulati | H04W 4/40 |
| | | | 370/329 |
| 2009/0021418 A1* | 1/2009 | Winstead | G01S 7/4021 |
| | | | 342/120 |
| 2010/0111001 A1 | 5/2010 | Simmons et al. | |
| 2020/0036487 A1* | 1/2020 | Hammond | H04L 5/0012 |
| 2020/0241127 A1 | 7/2020 | Franceschini et al. | |
| 2022/0060249 A1* | 2/2022 | Nath | H04W 72/54 |
| 2022/0116886 A1* | 4/2022 | Manolakos | G01S 7/023 |
| 2022/0256519 A1* | 8/2022 | Jeon | G01S 7/0235 |
| 2023/0266434 A1* | 8/2023 | Kalantari | H04W 72/541 |
| | | | 342/159 |
| 2023/0314554 A1* | 10/2023 | Kalantari | G01S 7/003 |
| | | | 342/59 |
| 2023/0412245 A1* | 12/2023 | Faragher | G01S 7/0235 |

FOREIGN PATENT DOCUMENTS

| | | |
|---|---|---|
| GB | 2509060 A | 6/2014 |
| WO | 2021226590 A1 | 11/2021 |

OTHER PUBLICATIONS

European Patent Office, "Communication pursuant to Article 94(3)EPC", dated May 8, 2025, from EP Application No. 23176957.1, from Foreign Counterpart to U.S. Appl. No. 18/050,070, pp. 1 through 7, Published: EP.

* cited by examiner

SYSTEMS AND METHODS FOR MITIGATING TELECOMMUNICATIONS SIGNAL INTERFERENCE TO RADAR ALTIMETERS

CROSS-REFERENCE TO RELATED APPLICATIONS

This application claims the benefit of U.S. Provisional Application Ser. No. 63/349,879, filed Jun. 7, 2022, and titled "SYSTEMS AND METHODS FOR MITIGATING TELECOMMUNICATIONS SIGNAL INTERFERENCE TO RADAR ALTIMETERS," the contents of which are hereby incorporated herein by reference.

BACKGROUND

Radar altimeters are important sensors for many types of vehicles. They provide accurate real-time measurements of height above terrain, which can be used by flight control systems, terrain awareness warning systems, traffic collision avoidance systems, and other operating systems. Radar altimeters generally operate by transmitting radio signals from the aircraft down towards the terrain surface, receiving the reflected or scattered signal back from the terrain, and determining the height above the terrain by measuring the round-trip propagation time of the signal. The signals transmitted by radar altimeters are typically within the 4200-4400 MHz frequency band.

Due to their function and performance requirements, radar altimeters are susceptible to radio frequency (RF) interference from other transmitters utilizing nearby frequency bands. Until recently, these surrounding frequency bands were primarily used for satellite downlink communications, resulting in weak signals at or near the Earth's surface which posed no significant risk of interference to radar altimeters. However, modern telecommunications technology has expanded spectrum access for terrestrial telecommunications networks. For example, fifth-generation (5G) mobile networks have enabled many more network devices to communicate in these surrounding frequency bands, thereby producing much stronger and much more ubiquitous RF signals that can interfere with radar altimeter receivers.

Radar altimeters traditionally addressed RF signal interference by implementing a receiver band-pass filter that rejects signals from adjacent frequency bands. Although band-pass filters can reduce RF interference very close to operating radar altimeter bands, more complex filter designs risk compromising the passband of the radar altimeter receiver and thus may adversely impact the performance of the radar altimeter. Furthermore, with the onset of telecommunications across a greater range of surrounding frequency bands, filtering alone may be insufficient to protect the radar altimeter from RF interference because the rejection attainable via conventional band-pass filtering is limited at frequencies very close to the altimeter band. A need therefore exists for alternative techniques to enable safe and reliable radar altimeter operations with increased use of frequencies immediately adjacent to the radar altimeter band by other communications systems.

SUMMARY

The details of one or more embodiments are set forth in the summary and description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

Systems and methods are disclosed in the present disclosure for reducing or mitigating RF interference to radar altimeters implemented on vehicles. Exemplary embodiments of the present disclosure include a radar altimeter system that comprises an RF receiver subsystem configured to adjust the operation of a radar altimeter based on information received from network signals, such as signals broadcast from a 5G telecommunications network.

In some embodiments, the RF receiver subsystem includes a network receiver, and is configured to adjust the operation of the radar altimeter based on the signal strength of network signals received from the network receiver. When the signal strength of the network signals exceeds the sensitivity of the network receiver and the interference susceptibility of the radar altimeter, the RF receiver subsystem is configured to adjust the operation of the radar altimeter to mitigate the impact of the network signals on the radar altimeter. In one embodiment, adjusting the operation of the radar altimeter includes disabling one or more components of the radar altimeter during certain time intervals or otherwise mitigating the impact of the interfering signals on the radar altimeter.

In some embodiments, the network receiver is configured to extract or decode timing synchronization information from the received network signals. The timing synchronization information indicates one or more time periods in which the telecommunications network is undergoing high RF signal transmissions (e.g., downlink signals from base stations) and one or more time periods in which the telecommunications network is undergoing low RF signal transmissions (e.g., uplink signals from user equipment). The RF receiver subsystem is configured to mitigate interference from network signals by enabling the radar altimeter to operate normally (e.g., unrestricted) during a time period of low RF signal transmissions and to adjust the operation of the radar altimeter during a time period of high RF signal transmissions.

In one exemplary embodiment, a system comprises a radar altimeter configured to be coupled to a vehicle. The radar altimeter comprises a transmitter configured to generate radio frequency (RF) signals, and to provide the RF signals to an antenna configured to radiate the RF signals towards a ground location. The radar altimeter comprises a receiver configured to receive a reflected portion of the RF signals. The radar altimeter comprises a controller coupled to the transmitter and the receiver. The controller is configured to control the transmitter, to receive the reflected portion of the RF signals, and to determine a height parameter based on the reflected portion of the RF signals. The system further comprises a network receiver coupled to the radar altimeter. The network receiver is configured to: receive network signals corresponding to a telecommunications network. The network receiver is configured to determine at least one signal parameter from the network signals, wherein the at least one signal parameter includes a signal strength of the network signals and timing synchronization information of the network signals. The system further comprises at least one processor coupled to the network receiver and the controller. The at least one processor is configured to configure operation of the radar altimeter based on the at least one signal parameter from the network signals.

In another exemplary embodiment, a radio frequency (RF) subsystem is provided. The RF subsystem is configured to be coupled to a vehicle, and configured to couple to a radar altimeter of the vehicle. The RF subsystem comprises a network receiver configured to be coupled to a receiver of the radar altimeter. The network receiver is configured to receive network signals corresponding to a telecommunications network. The network receiver is configured to determine at least one signal parameter from the network signals, wherein the at least one signal parameter includes a signal strength of the network signals and timing synchronization information of the network signals. The RF subsystem further comprises at least one processor coupled to the network receiver. The at least one processor is configured to configure operation of the receiver of the radar altimeter based on the at least one signal parameter from the network signals.

In yet another exemplary embodiment, a method, comprises receiving network signals from a telecommunications network at a vehicle having a radar altimeter. The method further comprises determining at least one signal parameter from the network signals, wherein the at least one signal parameter includes a signal strength of the network signals and timing synchronization information of the network signals. The method further comprises configuring operation of the radar altimeter based on the at least one signal parameter from the network signals.

Additional exemplary embodiments are described in conjunction with the detailed description below.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as further described with reference to the detailed description.

Figure 1:
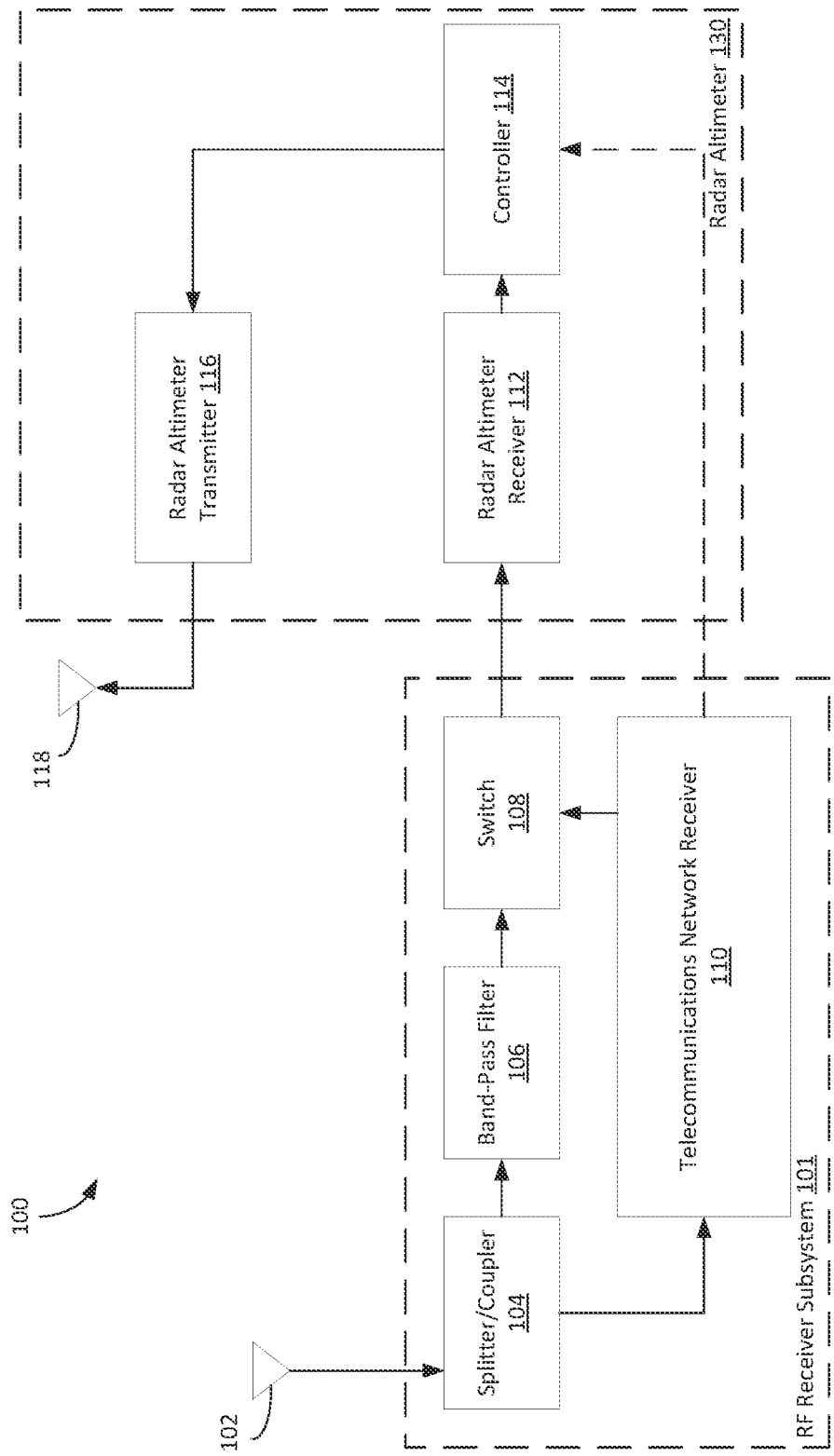
FIG. 1 depicts a block diagram including an exemplary RF receiver subsystem configured to reduce RF interference to a radar altimeter.

In accordance with common practice, the various described features are not drawn to scale but are drawn to emphasize specific features relevant to the exemplary embodiments. As used herein, the term "exemplary" merely indicates the accompanying description is used as an example, rather than implying an ideal, essential, or preferable feature of the invention.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Systems and methods are disclosed in the present disclosure for reducing or mitigating RF interference from radar altimeters implemented on vehicles. Exemplary embodiments of the present disclosure include a radar altimeter system that comprises an RF receiver subsystem configured to adjust the operation of a radar altimeter based on signal parameters received from network signals, such as signals broadcast from a telecommunications network. By actively monitoring the environment of the telecommunications network and adapting the operation of the radar altimeter to avoid potential interference threats, vehicles equipped with radar altimeters can operate near the frequency range of the telecommunication network with reduced risk of signals impacting the radar altimeter. That is, a vehicle can operate freely without having to consider a minimum standoff distance that must be maintained from one or more network elements of the telecommunications network, and no prior knowledge of the network element operations such as antenna patterns or downtilt are needed to safeguard the operation of the radar altimeter.

FIG. 1 depicts a block diagram including an exemplary RF receiver subsystem configured to reduce RF interference to a radar altimeter. The radar altimeter system 100 (referred to simply as "system" 100) is configured to be implemented on a vehicle. Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), or any other vehicle configured to utilize a radar altimeter. Throughout the disclosure, the vehicle may be further illustrated as an aircraft with the understanding that the principles described herein apply to other vehicles where applicable.

System 100 additionally includes an RF receiver subsystem 101 and a radar altimeter 130 coupled to the RF receiver subsystem 101. In some embodiments, the RF receiver subsystem 101 or one or more components thereof may be implemented as an integrated unit (for example, as a line replaceable unit (LRU)), or may be dispersed along various locations of the vehicle and electrically coupled to other systems by buses, signal pathways, or networks. Additionally, or alternatively, the RF receiver subsystem 101 or one or more components thereof may be installed on conventional or previously installed radar altimeter systems, including legacy radar altimeters already implemented on the vehicle. In some embodiments, the RF receiver subsystem 101 is coupled to other systems on the vehicle, such as navigation, flight control, communication, and/or sensor systems, and may transmit output signals to those systems in addition to the components of system 100 explicitly shown in FIG. 1.

RF receiver subsystem 101 includes a splitter or coupler 104 (which will be described as a splitter for pedagogical explanation), band-pass filter 106, and switch 108. RF receiver subsystem 101 further includes a receiving antenna 102 coupled to the splitter 104. Antenna 102 is configured to receive electromagnetic RF signals, including network signals from a network element as described further herein. Antenna 102 provides the RF signals to splitter 104, which is configured to provide versions of the RF signals to two distinct signal pathways: one pathway to band-pass filter 106 for further filtering and another pathway to telecommunications network receiver 110 for further signal processing of the network signals. On the filtering side, band-pass filter 106 is configured to filter out components of the RF signals that are adjacent to the operating bands of the radar altimeter (e.g., radar altimeter receiver 112 and radar altimeter transmitter 116). Components of the RF signals within the passband of the band-pass filter 106, including the passband of the radar altimeter, are allowed to pass through band-pass filter 106 to switch 108. While band-pass filter 106 can provide some protection from potential interfering RF signals, band-pass filter 106 may not be able to filter out all sources of potential RF interference, such as from sources from terrestrial-based telecommunication networks utilizing frequency bands adjacent or near the operating band of the radar altimeter.

Switch 108 is configured to switch between an "on" and "off" configuration to activate and de-activate the radar altimeter receiver, respectively. Switch 108 is set based on control signals from telecommunications network receiver 110. When telecommunications network receiver 110 configures switch 108 in the "off" configuration, switch 108 alters the signal output to mitigate RF signals from being received at the radar altimeter receiver 112 input. This configuration protects radar altimeter receiver 112 from RF signal interference caused by external sources that could hinder or render the radar altimeter unable to determine correct data. In the "on" configuration, switch 108 allows the RF signals received from band-pass filter 106 to pass and provides the signals to the radar altimeter receiver 112. The radar altimeter receiver 112 then provides the RF signals to controller 114 to determine, for example, the height above terrain of the vehicle. In some embodiments, the radar altimeter transmitter 116 operates normally even during periods of high RF signal interference while the input to the radar receiver 112 is switched off.

To transmit RF signals from system 100, controller 114 is configured to send control signals to radar altimeter transmitter 116. Radar altimeter transmitter 116 then generates RF signals that are radiated from transmitting antenna 118 towards the terrain and/or to a point of interest such as a landmark, ground receiver, or other distinctive feature. Reflected signals are collected by radar altimeter receiver 112, which are used to determine the height above terrain as previously described. Optionally, controller 114 receives signals (e.g., control signals or data signals including network signal parameters and operating parameters) from network receiver 110.

Controller 114, or any of the other processing systems described herein (e.g., network receiver 110, processor 132), may include any one or combination of processors, microprocessors, digital signal processors, application specific integrated circuits, field programmable gate arrays, and/or other similar variants thereof. These processing systems may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Although not explicitly shown in FIG. 1, controller 114 and/or network receiver 110 can include or be coupled to a memory. The memory can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. The memory may also include one or more databases to store acquired data.

The above description of system 100 constitutes normal operation for an exemplary radar altimeter, which can be implemented provided there is no significant RF signal interference from external sources. Once the vehicle enters a region of significant RF signal transmittance, such as from terrestrial-based 5G networks communicating over frequencies surrounding the operating band of the radar altimeter system 100, antenna 102 is likely to receive substantial amounts of interfering RF signals that are not associated with the RF signals radiated by antenna 118, i.e., the ground-reflected components of the RF signals generated from radar altimeter transmitter 116. Therefore, entering a region of significant RF signal transmittance, particularly from signals that are still within the passband of the band-pass filter 106, risks faults or malfunctions caused by the radar altimeter in generating parameters based on incorrect signal reception. Reliance on the radar altimeter in such hazardous conditions can lead to disastrous consequences for the vehicle or the personnel onboard, who may be unaware that RF signal interference is impacting the operation of the radar altimeter.

To mitigate significant RF interference from telecommunication networks from impacting the radar altimeter, system 100, specifically, RF receiver subsystem 101 includes a telecommunications network receiver 110 (referred to as "network receiver" 110). As shown in FIG. 1, the radar altimeter 130 is defined to comprise the radar altimeter receiver 112, the radar altimeter transmitter 116, and optionally the controller 114. As used herein, to mitigate RF interference to the radar altimeter 130 means that interfering signals are not provided to the radar altimeter 130, for example, by not being received at an input of the radar altimeter 130, specifically, the input of the radar altimeter receiver 112. Thus, a system that comprises the radar altimeter 130 (such as radar altimeter system 100) may receive RF signals that could interfere with operation of the radar altimeter 130, but any interfering signals that are acquired by system 100 are mitigated before use by the radar altimeter 130.

In the embodiment shown in FIG. 1, network receiver 110 is coupled to splitter 104 and configured to receive RF signals from splitter 104, and coupled to switch 108. In one embodiment, the network receiver 110 includes a 5G receiver, though other network receivers may also be included. Network receiver 110 also includes a processing system comprising a processor or other processing circuitry configured for extracting or decoding network signals.

As previously described, antenna 102 is configured to receive RF signals including network signals transmitted from a network element. For example, a 5G communications networks includes a base station configured to provide wireless service to user equipment (e.g., phones, laptops, and mobile devices) utilizing the telecommunications network. The 5G base station periodically broadcasts network signals that include one or more signal parameters of the telecommunications network. These network signals can be received by antenna 102, and provided to network receiver 110, to determine the signal parameters from the network signals, including the signal strength of the received signals. In some embodiments, network receiver 110 is configured to decode the network signals and determine signal parameters such as timing synchronization information. The timing synchronization information includes data on when (that is, a scheduled time period) the base station(s) undergoes downlink transmission and when the base station(s) receive uplink transmission from user equipment. In downlink transmission, the base stations are configured to transmit downlink signals that include network parameters "downstream" to the user equipment in the telecommunication network, typically through one or more radio points located in the network. In uplink transmission, the base stations are not transmitting signals to user equipment, but instead are receiving uplink signals from the user equipment. Generally, in a 5G network, uplink signals from the user equipment are significantly less powerful in signal strength than downlink signals from the base stations, and are thus unlikely to cause harmful interference to the radar altimeter receiver.

In some embodiments, network receiver 110 is configured to extract the timing synchronization information to determine when the telecommunications network will undergo downlink and uplink transmission. In the 5G context, the network architecture for frequency bands near the radar altimeter operating band is typically deployed using time division duplexing (TDD) techniques, and as part of the network operation, timing intervals when the network is "active" (for example, transmitting in the downlink direction) and when the network is "quiet" (for example, transmitting in the uplink direction) are determined by the base station(s) a priori, typically during a set period of time each day. Accordingly, the timing information for when downlink transmission and uplink transmission will occur is known in the network, but not necessarily to external devices that are not utilizing the specific network. However, since network receiver 110 is configured to extract the timing synchronization information from the network, network receiver 110 can determine the "active" and "quiet" periods for that particular network from the broadcast network signals even when the vehicle is not utilizing the telecommunications network.

How the network signals affect the operation of the radar altimeter is, in some embodiments, determined based on the signal strength of the network signals. If the network signals are very weak, for example, they are weaker than the sensitivity of the network receiver 110 to detect the signals, then the radar altimeter is allowed to operate normally, unrestricted by the network receiver 110. This is because the network signals will likely not impede the operation of the radar altimeter since the signals are so weak that the strength of the network signals is below the sensitivity of the network receiver 110. In such case, the network receiver 110 is not required to decode or extract timing synchronization from the signals.

In some cases, the network signals have a signal strength that is above the sensitivity of the network receiver 110. Network receiver 110 is configured to determine the signal strength of the network signals and to compare the signal strength to the interference susceptibility of the radar altimeter receiver 112. If the signal strength of the network signals is less than the susceptibility of the radar altimeter receiver 112, then the operation of the radar altimeter is not restricted by network receiver 110 because the network signals are still not likely to impact normal operation of the radar altimeter. Despite that the signal strength of the network signals exceeds the sensitivity of the network receiver 110, the signal strength does not exceed the susceptibility of the radar altimeter receiver 112, and so the radar altimeter receiver 112 is not likely to produce false or misleading data as result of processing the network signals. Accordingly, network receiver 110 is not required to decode or extract timing synchronization from the network signals when the signal strength is less than the susceptibility of the radar altimeter receiver 112.

But, in some situations, particularly if the vehicle is near the ground or in proximity to multiple RF sources, the signal strength of the network signals will exceed the interference susceptibility of the radar altimeter receiver 112, and will likely impact the radar altimeter should it continue operating. When this occurs, network receiver 110 takes a more active role. In some embodiments, network receiver 110 is configured to extract or decode the timing synchronization information from the network signals when it determines that the signal strength exceeds the susceptibility of the radar altimeter. Based on the timing synchronization information, network receiver 110 is configured to determine one or more time periods of high RF transmissions in the network (for example, transmissions in the downlink direction) and determine one or more time periods of low RF transmissions in the network (for example, during scheduled network inactivity or uplink transmissions).

Network receiver 110 then configures the operation of the radar altimeter 130 based on the timing synchronization information. At times where the network is active and undergoing high RF transmissions, network receiver 110 is configured to disable the radar altimeter 130 (e.g., the radar altimeter receiver 112 and optionally other components of the radar altimeter 130). In some embodiments, only the radar altimeter receiver 112 is disabled while other components of the radar altimeter can operate normally. Network receiver 110 can then activate the radar altimeter 130 when the network is not undergoing high RF transmissions. Referring to the exemplary embodiment in FIG. 1, network receiver 110 is configured to send control signals to switch 108 when the network is undergoing high RF transmissions to shunt the output to radar altimeter receiver 112, thereby mitigating any RF signals from being received at the input of the radar altimeter receiver 112. For a period of low RF transmissions, network receiver 110 is configured to send control signals to switch 108 to output RF signals back to the input of radar altimeter receiver 112. The radar altimeter 130 is capable of providing a continuous altitude output reading during these times of intermittent operation, for example by coasting, filtering, or averaging of successive altitude readings, such that downstream systems on the vehicle which utilize the radar altimeter output are not affected.

RF receiver subsystem 101 can be implemented in other ways. In some embodiments, when network receiver 110 determines that network signals will impact the operation of the radar altimeter, network receiver 110 is configured to determine one or more operating parameters of the radar altimeter based on the signal strength of the network signals. For example, network receiver can determine an alternative operating frequency bandwidth and/or an alternative signal power to transmit RF signals by the radar altimeter. Network receiver 110 optionally sends the alternative operating parameters to controller 114; controller 114 then configures the radar altimeter transmitter 116 in accordance with the alternative operating parameters.

In some embodiments, network receiver 110 is configured to extract or decode other signal parameters from the network signals. In one embodiment, network receiver 110 is configured to extract or decode timing offset information to estimate the distance to the base station(s) that radiated the network signals, and configure the operation of the radar altimeter based on the distance determination. For example, network receiver 110 can disable or otherwise restrict operation of the radar altimeter for distances that are relatively close to the vehicle.

Figure 2:
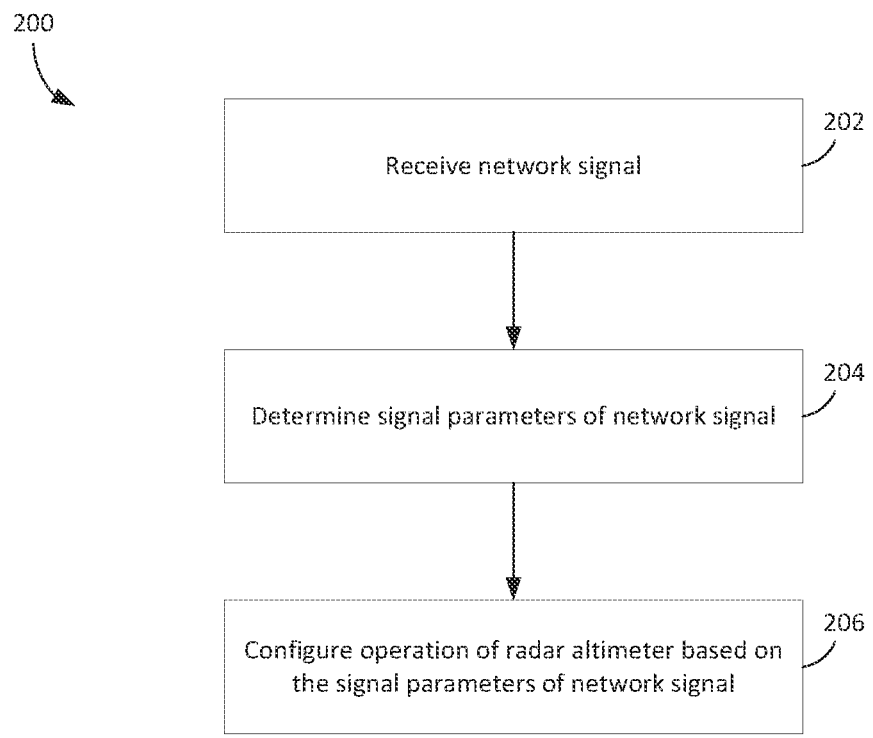
FIG. 2 depicts a flow diagram illustrating an exemplary method for operating a radar altimeter based on signal parameters from a network signal.

FIG. 2 depicts a flow diagram illustrating an exemplary method for operating a radar altimeter based on signal parameters from a network signal. Method 200 may be implemented via the radar altimeter system 100 described in conjunction with FIG. 1, but may be implemented via other systems as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 200 includes receiving one or more network signals at block 202. The network signals are broadcast from a network element of telecommunications network such as a base station of a 5G communications network. The network signals can be received, for example, by an antenna coupled to an RF receiver subsystem 101 as described in FIG. 1.

Method 200 proceeds to block 204 and determines one or more signal parameters of the network signals. In some embodiments, the signal parameters include a signal strength of the network signals. Additionally, the signal parameters include timing synchronization information. The timing synchronization information includes one or more time periods of high RF signal activity and one or more time periods of low RF signal activity in the network. In the context of a 5G network, the timing synchronization information includes one or more time periods when the base station(s) are operating in downlink signal transmission (a high RF signal activity period) and one or more time periods when the base station(s) are operating in uplink signal transmission (a low RF signal activity period). Other signal parameters can also be extracted or decoded from the network signals.

At block 206, method 200 proceeds by configuring the operation of a radar altimeter based on the signal parameters of the network signals. In some embodiments, the radar altimeter or the radar altimeter receiver is disabled (e.g., prevented from operating) when the signal strength of the network signals exceeds the interference susceptibility of the radar altimeter, for example, by exceeding a threshold signal strength value, that represents a maximum signal strength for safe operation of the radar altimeter. Other thresholds indicative of radar altimeter susceptibility may be used. In some embodiments, the radar altimeter is disabled when the timing synchronization information extracted or decoded from the signal parameters indicates that the network is undergoing a period of high RF signal transmission, such as a period of downlink signal transmission. In other embodiments, may operate at adjusted operating parameters based on the signal strength and optionally the timing synchronization information of the network signals.

Figure 3:
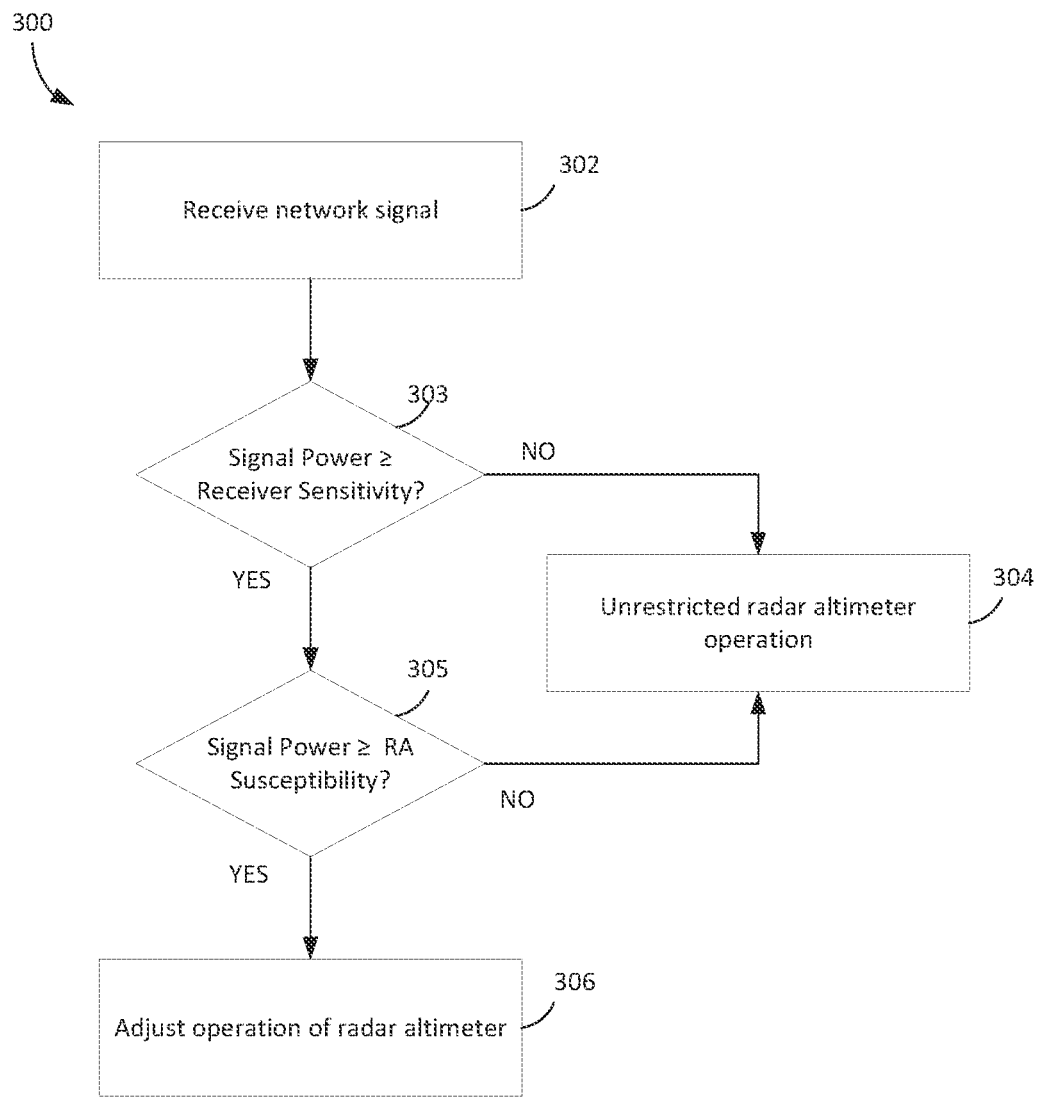
FIG. 3 depicts a flow diagram illustrating an exemplary method for adjusting the operation of a radar altimeter.

FIG. 3 depicts a flow diagram illustrating an exemplary method for adjusting the operation of a radar altimeter. Method 300 may be implemented via the radar altimeter system 100 described in conjunction with FIGS. 1-2, but may be implemented via other systems as well. In one implementation, method 300 is performed as an exemplary embodiment of method 200. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 300 includes receiving a network signal at block 302 from a base station or other network element of a telecommunications network. At block 303, method 300 determines whether the signal power of the network signal exceeds the sensitivity of the network receiver configured to extract or decode network signals from the telecommunications network. In one embodiment, method 300 performs block 303 by determining whether the signal power of the network signal exceeds a threshold level indicative of the network receiver sensitivity. If the signal power does not exceed the receiver sensitivity, then method 300 proceeds to block 304 and enables unrestricted operation of the radar altimeter.

In contrast, for a network signal that does exceed the sensitivity of the network receiver, then method 300 proceeds to block 305 to determine whether the signal power of the network signal exceeds the interference susceptibility of the radar altimeter. If the signal power exceeds the sensitivity of the network receiver but does not exceed the susceptibility of the radar altimeter, then method 300 proceeds to block 304 and enables unrestricted operation of the radar altimeter. In one embodiment, method 300 performs block 305 by determining whether the signal power of the network signal exceeds a threshold level indicative of the radar altimeter susceptibility. If the signal power of the network signal exceeds the susceptibility of the radar altimeter, then method 300 proceeds to block 306 to adjust the operation of the radar altimeter. As previously described, in some embodiments adjusting the operation includes mitigating the network signals before they are input to the radar altimeter and/or by disabling the radar altimeter. In other embodiments, adjusting the operation includes determining one or more operating parameters of the radar altimeter and configuring the radar altimeter based on the operating parameters. Although not explicit in FIG. 3, the operation of the radar altimeter can further be adjusted based on timing synchronization information extracted or decoded from the network signal. For example, adjusting the operation of the radar altimeter at block 306 can further include determining timing synchronization information of the network signal and configuring the radar altimeter to operate only during a period of low RF transmissions in the telecommunications network based on the timing synchronization information.

Figure 4:
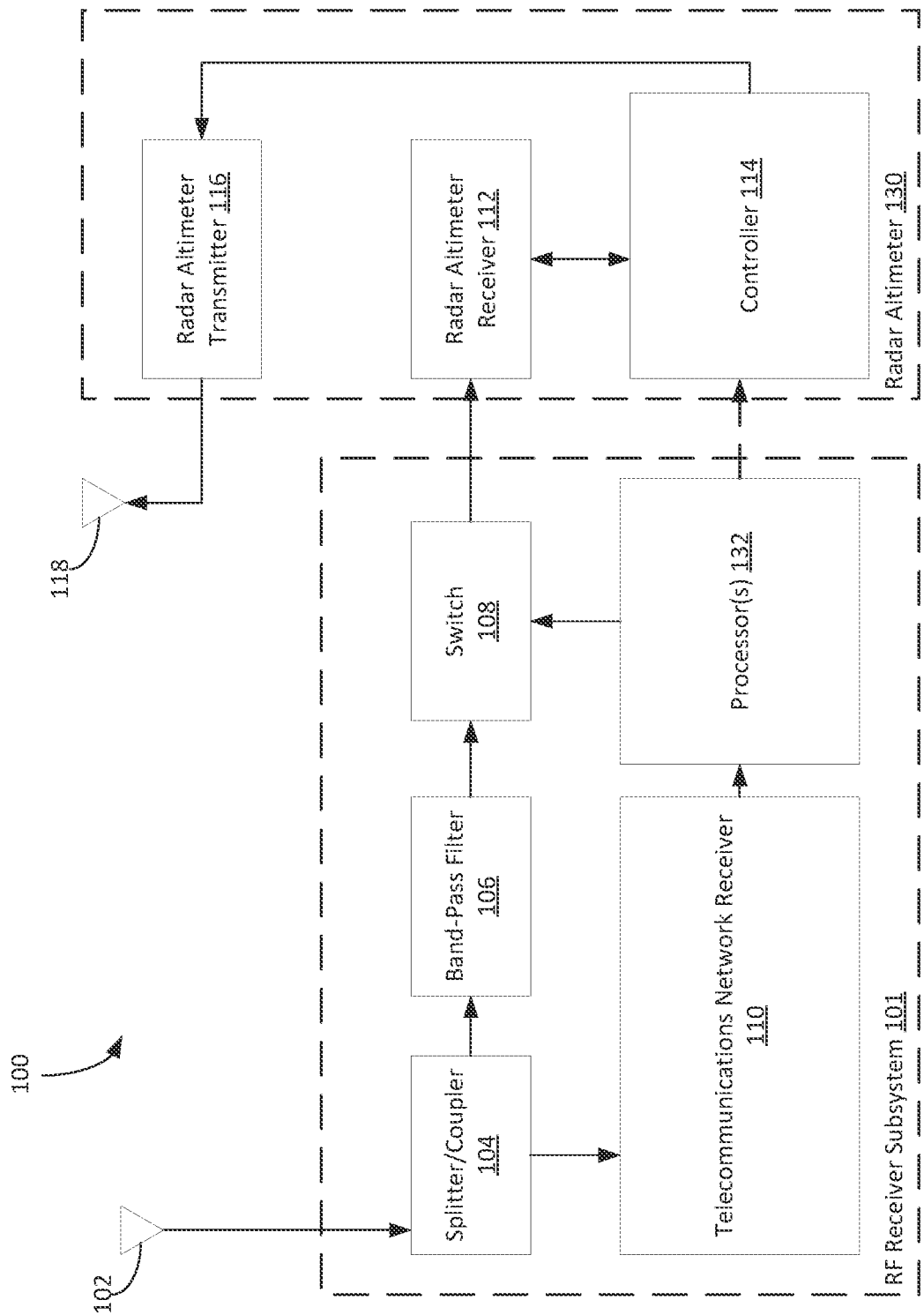
FIG. 4 depicts a block diagram including an exemplary RF receiver subsystem configured to reduce RF interference to a radar altimeter.

FIG. 4 depicts a block diagram including an exemplary RF receiver subsystem configured to reduce RF interference to a radar altimeter. The system 100 may be implemented as described in FIG. 1 and the methods described in FIGS. 2-3. Except as otherwise described, the components with identical reference numerals operate identically as described in FIG. 1.

RF receiver subsystem 101 includes one or more processors 132 coupled to telecommunications network receiver 110 and switch 108. In some embodiments, processor 132 is configured to receive the signal parameters from telecommunications network receiver 110, including the signal strength and timing synchronization information of the network signals. Processor 132 is configured to configure the operation of the radar altimeter 130 based on the signal strength and timing synchronization information. For example, as previously described with respect to FIG. 1, processor 132 can determine that the signal strength and timing synchronization information indicates a period of low (uplink) and/or high (downlink) signal activity in the terrestrial network. In another example, processor 132 determines that the signal strength of the network signals is greater than the sensitivity of network receiver 110 and greater than the susceptibility of radar altimeter 130.

Processor 132 can include control circuitry configured for controlling the operation of switch 108. During a period of low activity, processor 132 sets the switch 108 to an open configuration in which signals received from antenna 102 are allowed to pass through switch 108 to radar altimeter receiver 112. During a period of high activity, processor 132 sets the switch 108 to a closed configuration which prevents any signals from being received by the radar altimeter receiver 112. Processor 132 also may adjust the operation of radar altimeter 130 based on the processing of method 300 previously described, that is, based on the sensitivity of the network receiver 110 and susceptibility of the radar altimeter 130.

In some embodiments, processor 132 sends the determination of the period(s) of low and/or high activity to controller 114 of the radar altimeter 130. Controller 114 can then adjust the operation of the radar altimeter receiver 112 and optionally the operation of radar altimeter transmitter 116 based on the period of low and/or high activity in the terrestrial network. The monitoring of the radar altimeter 130 by controller 114 based on information extracted from network signal can be done in combination with the control of switch 108 by processor 132. For example, controller 114 can send a control signal that disables the radar altimeter receiver 112 during a period of high signal activity (as determined from processor 132), and may energize the radar altimeter receiver 112 to resume operation once processor 132 determines that the network signals indicate no period of high signal activity. Additionally, or alternatively, controller 114 can adjust the operation of radar altimeter transmitter 116, such as by restricting operation of the radar altimeter transmitter 116 when processor 132 determines a high signal strength and/or that the terrestrial network is operating during a period of high activity.

Controller 114 can also adjust the operation of radar altimeter based on the processing of method 300 previously described. That is, processor 132 can determine, based on the sensitivity of network receiver 110 and the susceptibility of radar altimeter 130, whether to adjust the operation of radar altimeter 130, and if so, sends signals to controller 114 instructing controller 114 to adjust the operation of radar altimeter receiver 112 accordingly.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application-specific integrated circuits (ASICs).

EXAMPLE EMBODIMENTS

Example 1 includes a system, comprising: a radar altimeter configured to be coupled to a vehicle, comprising: a transmitter configured to generate radio frequency (RF) signals, and to provide the RF signals to an antenna configured to radiate the RF signals towards a ground location, a receiver configured to receive a reflected portion of the RF signals, and a controller coupled to the transmitter and the receiver, wherein the controller is configured to control the transmitter, to receive the reflected portion of the RF signals, and to determine a height parameter based on the reflected portion of the RF signals; and a network receiver coupled to the radar altimeter, wherein the network receiver is configured to: receive network signals corresponding to a telecommunications network; determine at least one signal parameter from the network signals, wherein the at least one signal parameter includes a signal strength of the network signals and timing synchronization information of the network signals; and at least one processor coupled to the network receiver and the controller, wherein the at least one processor is configured to configure operation of the radar altimeter based on the at least one signal parameter from the network signals.

Example 2 includes the system of Example 1, wherein the at least one processor is configured to determine at least one period of high RF transmissions in the telecommunications network based on the timing synchronization information of the network signals, and to determine at least one period of low RF transmissions in the telecommunications network based on the timing synchronization information of the network signals.

Example 3 includes the system of Example 2, wherein the at least one period of high RF transmissions corresponds to at least one period of downlink signal communication in the telecommunications network, and wherein the at least one period of low RF transmissions corresponds to at least one period of uplink signal communication in the telecommunications network.

Example 4 includes the system of any of Examples 2-3, wherein to configure the operation of the radar altimeter comprises: to disable the radar altimeter receiver when the timing synchronization information indicates that the telecommunications network is transmitting during the at least one period of high RF transmissions; and to enable the operation of the radar altimeter receiver when the timing synchronization information indicates that the telecommunications network is transmitting during the at least one period of low RF transmissions.

Example 5 includes the system of any of any of Examples 1-4, wherein one or more of: the transmitter, the receiver, or the controller of the radar altimeter is configured to operate during at least one period of high RF transmissions from the telecommunications network.

Example 6 includes the system of any of Examples 1-5, wherein to receive network signals corresponding to a telecommunications network comprises to receive network signals from a fifth-generation (5G) base station entity.

Example 7 includes the system of any of Examples 1-6, comprising a switch coupled to the at least one processor and the radar altimeter receiver, wherein in response to receiving a first control signal from the at least one processor, the switch is configured to prevent the RF signals from being received at the radar altimeter receiver, wherein in response to receiving a second control signal from the at least one processor, the switch is configured to provide the RF signals to the radar altimeter receiver.

Example 8 includes a method, comprising: receiving network signals from a telecommunications network at a vehicle having a radar altimeter; determining at least one signal parameter from the network signals, wherein the at least one signal parameter includes a signal strength of the network signals and timing synchronization information of the network signals; and configuring operation of the radar altimeter based on the at least one signal parameter from the network signals.

Example 9 includes the method of Example 8, comprising: determining that the signal strength of the network signals exceeds a threshold value indicative of an interference susceptibility of the radar altimeter; and adjusting the operation of the radar altimeter in response to determining that the signal strength of the network signals exceeds the threshold value.

Example 10 includes the method of any of Examples 8-9, comprising: determining that the signal strength of the network signals exceeds a first threshold value indicative of a sensitivity of a network receiver configured to decode or extract the at least one signal parameter from the network signals; in response to determining that the signal strength of the network signals exceeds the first threshold value, determining that the signal strength of the network signals exceeds a second threshold value indicative of an interference susceptibility of a radar altimeter; and adjusting the operation of the radar altimeter in response to: (1) determining that the signal strength of the network signals exceeds the first threshold value; and (2) determining that the signal strength of the network signals exceeds the second threshold value.

Example 11 includes the method of any of Examples 8-10, comprising: determining that the signal strength of the network signals exceeds a first threshold value indicative of a sensitivity of a network receiver configured to decode or extract the at least one signal parameter from the network signals; determining that the signal strength of the network signals is less than a second threshold value indicative of an interference susceptibility of a radar altimeter; and in response to determining that the signal strength of the network signals exceeds the first threshold value and is less than the second threshold value, enabling unrestricted operation of the radar altimeter.

Example 12 includes the method of any of Examples 8-11, comprising: determining at least one period of high RF transmissions in the telecommunications network based on the timing synchronization information of the network signals, and determining at least one period of low RF transmissions in the telecommunications network based on the timing synchronization information of the network signals.

Example 13 includes the method of Example 12, wherein the at least one period of high RF transmissions corresponds to at least one period of downlink signal communication in the telecommunications network, and wherein the at least one period of low RF transmissions corresponds to at least one period of uplink signal communication in the telecommunications network.

Example 14 includes the method of any of Examples 12-13, comprising operating the radar altimeter during the at least one period of low RF transmissions in the telecommunications network.

Example 15 includes a radio frequency (RF) subsystem configured to be coupled to a vehicle, and configured to couple to a radar altimeter of the vehicle, the RF subsystem comprising: a network receiver configured to be coupled to a receiver of the radar altimeter, wherein the network receiver is configured to: receive network signals corresponding to a telecommunications network; determine at least one signal parameter from the network signals, wherein the at least one signal parameter includes a signal strength of the network signals and timing synchronization information of the network signals; and at least one processor coupled to the network receiver, wherein the at least one processor is configured to configure operation of the receiver of the radar altimeter based on the at least one signal parameter from the network signals.

Example 16 includes the RF subsystem of Example 15, wherein the at least one processor is configured to determine at least one period of high RF transmissions in the telecommunications network based on the timing synchronization information of the network signals, and to determine at least one period of low RF transmissions in the telecommunications network based on the timing synchronization information of the network signals.

Example 17 includes the RF subsystem of Example 16, wherein the at least one period of high RF transmissions corresponds to at least one period of downlink signal communication in the telecommunications network, and wherein the at least one period of low RF transmissions corresponds to at least one period of uplink signal communication in the telecommunications network.

Example 18 includes the RF subsystem of any of Examples 15-17, comprising a switch coupled to the at least one processor, wherein in response to receiving a first control signal from the at least one processor, the switch is configured to prevent RF signals from being received at the receiver of the radar altimeter, wherein in response to receiving a second control signal from the at least one processor, the switch is configured to provide the RF signals to the receiver of the radar altimeter.

Example 19 includes the RF subsystem of any of Examples 16-18, wherein to configure the operation of the receiver of the radar altimeter comprises: to disable the radar altimeter receiver when the timing synchronization information indicates that the telecommunications network is transmitting during the at least one period of high RF transmissions; and to enable the operation of the radar altimeter receiver when the timing synchronization information indicates that the telecommunications network is transmitting during the at least one period of low RF transmissions.

Example 20 includes the RF subsystem of any of Examples 15-19, wherein to configure operation of the receiver of the radar altimeter based on the at least one signal parameter from the network signals comprises to prevent RF signals from being received at the receiver of the radar altimeter when the signal strength of the network signals exceeds a susceptibility threshold of the radar altimeter.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   a radar altimeter configured to be coupled to a vehicle, comprising:
     a transmitter configured to generate radio frequency (RF) signals, and to provide the RF signals to an antenna configured to radiate the RF signals towards a ground location,
     a receiver configured to receive a reflected portion of the RF signals, and
     a controller coupled to the transmitter and the receiver, wherein the controller is configured to control the transmitter, to receive the reflected portion of the RF signals, and to determine a height parameter based on the reflected portion of the RF signals; and
   a network receiver coupled to the radar altimeter, wherein the network receiver is configured to:
   receive network signals corresponding to an off-board telecommunications network;
   decode the network signals received by the network receiver to determine at least one signal parameter from the network signals, wherein the at least one signal parameter includes a signal strength of the network signals and timing synchronization information of the network signals including scheduled time periods for downlink and uplink transmissions; and
   at least one processor coupled to the network receiver and the controller, wherein the at least one processor is configured to configure operation of the radar altimeter based on the at least one signal parameter from the network signals.

2. The system of claim 1, wherein the at least one processor is configured to determine at least one period of downlink transmissions in the off-board telecommunications network based on the timing synchronization information of the network signals, and to determine at least one period of uplink transmissions in the off-board telecommunications network based on the timing synchronization information of the network signals.

3. The system of claim 2, wherein the at least one period of downlink transmissions corresponds to at least one period of downlink signal communication in the off-board telecommunications network, and wherein the at least one period of uplink transmissions corresponds to at least one period of uplink signal communication in the off-board telecommunications network.

4. The system of claim 2, wherein to configure the operation of the radar altimeter comprises:
   to disable the radar altimeter receiver when the timing synchronization information indicates that the off-board telecommunications network is transmitting during the at least one period of downlink transmissions; and
   to enable the operation of the radar altimeter receiver when the timing synchronization information indicates that the off-board telecommunications network is transmitting during the at least one period of uplink transmissions.

5. The system of claim 1, wherein one or more of: the transmitter, the receiver, or the controller of the radar altimeter is configured to operate during at least one period of downlink transmissions from the off-board telecommunications network.

6. The system of claim 1, wherein to receive network signals corresponding to the off-board telecommunications network comprises to receive network signals from a fifth-generation (5G) base station entity.

7. The system of claim 1, comprising a switch coupled to the at least one processor and the radar altimeter receiver, wherein in response to receiving a first control signal from the at least one processor, the switch is configured to prevent the RF signals from being received at the radar altimeter receiver, wherein in response to receiving a second control signal from the at least one processor, the switch is configured to provide the RF signals to the radar altimeter receiver.

8. A method, comprising:
   receiving network signals from an off-board telecommunications network at a vehicle having a radar altimeter;
   decoding the network signals received by the network receiver to determine at least one signal parameter from the network signals, wherein the at least one signal parameter includes a signal strength of the network signals and timing synchronization information of the network signals including scheduled time periods for downlink and uplink transmissions; and
   configuring operation of the radar altimeter based on the at least one signal parameter from the network signals.

9. The method of claim 8, comprising:
   determining that the signal strength of the network signals exceeds a threshold value indicative of an interference susceptibility of the radar altimeter; and
   adjusting the operation of the radar altimeter in response to determining that the signal strength of the network signals exceeds the threshold value.

10. The method of claim 8, comprising:
    determining that the signal strength of the network signals exceeds a first threshold value indicative of a sensitivity of a network receiver configured to decode or extract the at least one signal parameter from the network signals;
    in response to determining that the signal strength of the network signals exceeds the first threshold value, determining that the signal strength of the network signals exceeds a second threshold value indicative of an interference susceptibility of a radar altimeter; and
    adjusting the operation of the radar altimeter in response to: (1) determining that the signal strength of the network signals exceeds the first threshold value; and (2) determining that the signal strength of the network signals exceeds the second threshold value.

11. The method of claim 8, comprising:
    determining that the signal strength of the network signals exceeds a first threshold value indicative of a sensitivity of a network receiver configured to decode or extract the at least one signal parameter from the network signals;
    determining that the signal strength of the network signals is less than a second threshold value indicative of an interference susceptibility of a radar altimeter; and
    in response to determining that the signal strength of the network signals exceeds the first threshold value and is less than the second threshold value, enabling unrestricted operation of the radar altimeter.

12. The method of claim 8, comprising:
determining at least one period of downlink transmissions in the off-board telecommunications network based on the timing synchronization information of the network signals, and
determining at least one period of uplink transmissions in the off-board telecommunications network based on the timing synchronization information of the network signals.

13. The method of claim 12, wherein the at least one period of downlink transmissions corresponds to at least one period of downlink signal communication in the off-board telecommunications network, and wherein the at least one period of uplink transmissions corresponds to at least one period of uplink signal communication in the off-board telecommunications network.

14. The method of claim 12, comprising operating the radar altimeter during the at least one period of uplink transmissions in the off-board telecommunications network.

15. A radio frequency (RF) subsystem configured to be coupled to a vehicle, and configured to couple to a radar altimeter of the vehicle, the RF subsystem comprising:
a network receiver configured to be coupled to a receiver of the radar altimeter, wherein the network receiver is configured to:
receive network signals corresponding to an off-board telecommunications network;
decode the network signals received by the network receiver to determine at least one signal parameter from the network signals, wherein the at least one signal parameter includes a signal strength of the network signals and timing synchronization information of the network signals including scheduled time periods for downlink and uplink transmissions; and
at least one processor coupled to the network receiver, wherein the at least one processor is configured to configure operation of the receiver of the radar altimeter based on the at least one signal parameter from the network signals.

16. The RF subsystem of claim 15, wherein the at least one processor is configured to determine at least one period of downlink transmissions in the off-board telecommunications network based on the timing synchronization information of the network signals, and to determine at least one period of uplink transmissions in the off-board telecommunications network based on the timing synchronization information of the network signals.

17. The RF subsystem of claim 16, wherein the at least one period of downlink transmissions corresponds to at least one period of downlink signal communication in the off-board telecommunications network, and wherein the at least one period of uplink transmissions corresponds to at least one period of uplink signal communication in the off-board telecommunications network.

18. The RF subsystem of claim 15, comprising a switch coupled to the at least one processor, wherein in response to receiving a first control signal from the at least one processor, the switch is configured to prevent RF signals from being received at the receiver of the radar altimeter, wherein in response to receiving a second control signal from the at least one processor, the switch is configured to provide the RF signals to the receiver of the radar altimeter.

19. The RF subsystem of claim 16, wherein to configure the operation of the receiver of the radar altimeter comprises:
to disable the radar altimeter receiver when the timing synchronization information indicates that the off-board telecommunications network is transmitting during the at least one period of downlink transmissions; and
to enable the operation of the radar altimeter receiver when the timing synchronization information indicates that the off-board telecommunications network is transmitting during the at least one period of uplink transmissions.

20. The RF subsystem of claim 15, wherein to configure operation of the receiver of the radar altimeter based on the at least one signal parameter from the network signals comprises to prevent RF signals from being received at the receiver of the radar altimeter when the signal strength of the network signals exceeds a susceptibility threshold of the radar altimeter.

* * * * *